(12) United States Patent
Lokkinen

(10) Patent No.: US 10,907,760 B2
(45) Date of Patent: Feb. 2, 2021

(54) INSTALLATION DEVICE

(71) Applicant: Picote Solutions Oy Ltd., Porvoo (FI)

(72) Inventor: Mika Lokkinen, Porvoo (FI)

(73) Assignee: Picote Solutions Oy Ltd., Porvoo (FI)

( * ) Notice: Subject to any disclaimer, the term of this patent is extended or adjusted under 35 U.S.C. 154(b) by 0 days.

(21) Appl. No.: 16/502,056

(22) Filed: Jul. 3, 2019

(65) Prior Publication Data

US 2019/0323644 A1    Oct. 24, 2019

Related U.S. Application Data

(63) Continuation-in-part of application No. 15/880,121, filed on Jan. 25, 2018, now Pat. No. 10,386,008.

(51) Int. Cl.
  *F16K 43/00*   (2006.01)
  *F16L 55/165*  (2006.01)
  *F16L 55/179*  (2006.01)

(52) U.S. Cl.
  CPC ......... *F16L 55/1656* (2013.01); *F16L 55/179* (2013.01)

(58) Field of Classification Search
  CPC ................. F16L 55/1656; F16L 55/179; E03F 2003/065
  See application file for complete search history.

(56) References Cited

U.S. PATENT DOCUMENTS

| | | | | |
|---|---|---|---|---|
| 4,872,253 A ‡ | 10/1989 | Carstensen | ......... | F16L 55/1645 29/507 |
| 5,244,624 A * | 9/1993 | Steketee, Jr. | .......... | B26D 3/163 264/516 |
| 5,673,469 A * | 10/1997 | Dickson | ................ | F16L 55/165 29/402.09 |
| 6,102,120 A * | 8/2000 | Chen | ....................... | E21B 29/10 166/287 |
| 6,171,435 B1 * | 1/2001 | Stoves | .................... | F16L 55/28 156/293 |
| 7,789,148 B2 * | 9/2010 | Rayssiguier | ............ | E21B 33/13 166/285 |
| 2005/0092382 A1 * | 5/2005 | Muhlin | ..................... | E03F 3/06 138/98 |
| 2007/0261751 A1 * | 11/2007 | Lepola | ................ | F16L 55/1612 138/98 |
| 2012/0291939 A1 * | 11/2012 | Warren | ................. | F16L 55/265 156/64 |

FOREIGN PATENT DOCUMENTS

WO    WO-2011057734 A1 *   5/2011   .......... F16L 55/1653

* cited by examiner
‡ imported from a related application

*Primary Examiner* — Reinaldo Sanchez-Medina
(74) *Attorney, Agent, or Firm* — Fasth Law Offices; Rolf Fasth

(57) ABSTRACT

An installation device for installing a branch liner in a branch point of a pipeline is disclosed. The device has a body with an inlet defined therein for fluids and a turning knob is rotatable relative to the body. The turning knob is attached to a first shaft and the opposite end of the first shaft is attached to a first barrel. The device further comprises a second barrel and a second shaft attached between said barrels. The device further comprises a duct extending between the body and the first barrel forming a passage for fluids from the inlet of the body to an area between said first barrel and said second barrel.

9 Claims, 7 Drawing Sheets

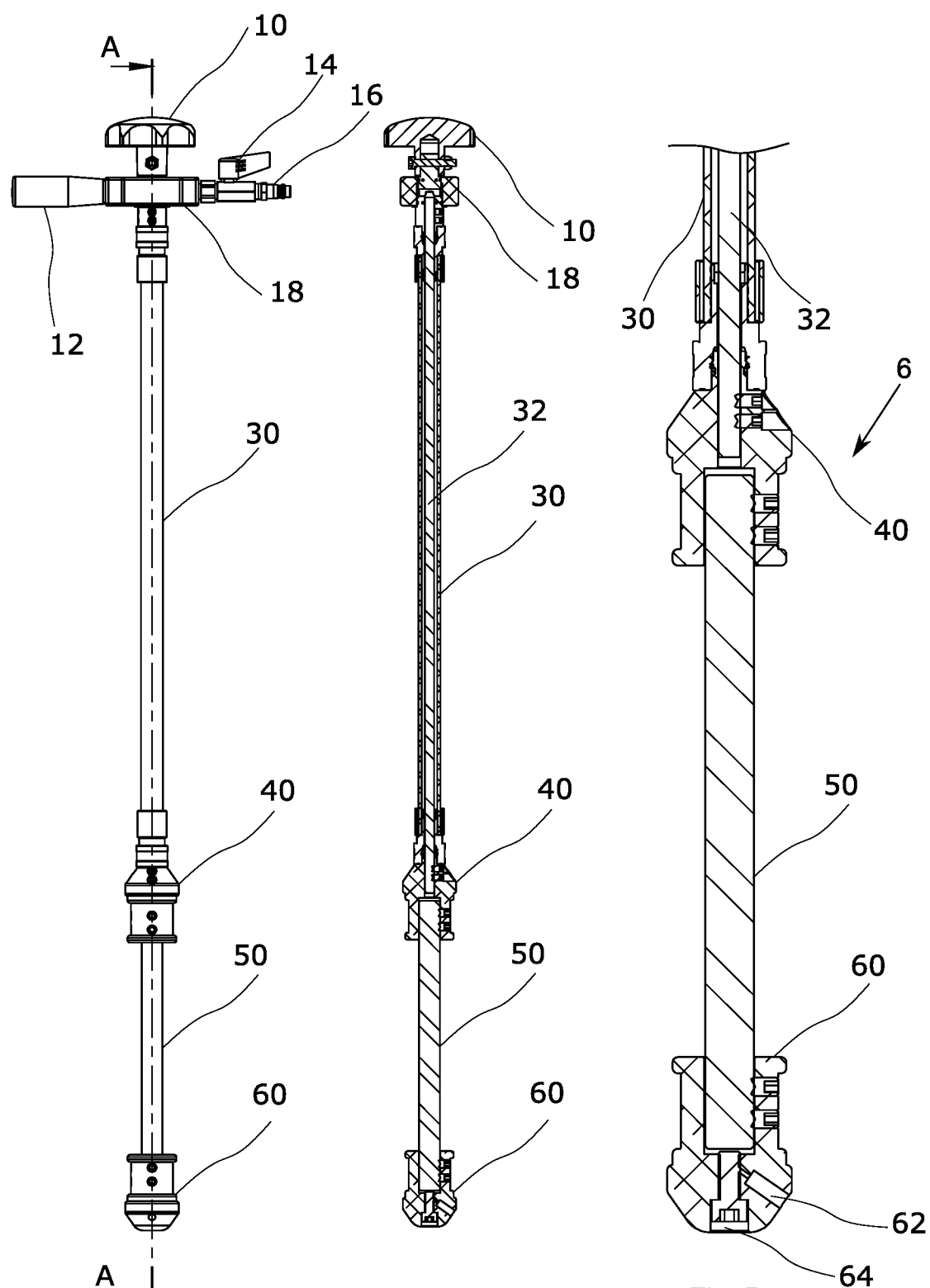

INSTALLATION DEVICE

PRIOR APPLICATION

This is a continuation-in-part (CIP) application of U.S. patent application Ser. No. 15/880,121, filed 25 Jan. 2018.

FIELD OF THE INVENTION

The present invention relates to pipe renovation tools and in particular to an installation device for installing a liner to a branch of a pipe system.

BACKGROUND AND SUMMARY OF THE INVENTION

Pipes, such as water and sewage pipes, approaching the end of their service life may be renovated e.g. by lining or coating the inside of an old pipe or by mounting a new pipe into an old pipe. An epoxy resin-impregnated polyester liner, for example, that is inverted into a pipe to be renovated using compressed air, steam or water can be used in lining. After inversion of the liner into the pipe, excess pressure is maintained inside the liner until the epoxy resin cures to its shape conforming to the walls of the old pipe. Modern technology allows even highly complex pipes to be lined.

One of the problems associated with the lining of pipes are joints of separate liners installed in a pipe system, typically at branches and junctions of the pipe system. A certain amount of overlapping of liners is desirable to prevent a leak between the liners. In branches and junctions this is sometimes difficult to implement by using straight tubular liners. Therefore, separate branch pieces have been used to prepare a branch with one layer of liner before lining the pipes which connect to the branch. The branch piece has essentially the same form as the branch, for example, T-shaped branch piece for a T-branch and Y-shaped branch piece for a Y-branch. A number of pulling wires and push rods are connected to the branch piece before installation so that the branch piece can be moved to the branch position. Inside the branch piece, a separate inflatable bladder is connected to an air hose which supplies air to the bladder and pushes the branch piece against walls of the pipe system at the branch position by inflating the bladder. A problem with this installation system is that it is a complicated system with all the wires, rods and hoses. It usually requires access to the branch position through more than one pipe and several employees have to work in cooperation to place the branch piece is correct position by using the pull wires and push rods.

It is an object of the present invention to present a device that alleviates the problems associated with the prior art solutions.

BRIEF DESCRIPTION OF THE DRAWINGS

In the following, the present invention is described in greater detail by means of preferred embodiments with reference to the accompanying drawings, in which

FIG. 3 shows a device according to an embodiment of the present invention;

FIG. 4 shows section A-A of the device of FIG. 3;

FIG. 5 shows lower part of the device of FIG. 4 in detail; and

DETAILED DESCRIPTION OF THE INVENTION

Renovation of pipelines in buildings, such as residential buildings, offices and industrial plants, by using the CIPP (Cured In-Place Pipe) pipe lining method has become common in recent years. The CIPP industry has evolved from leak repairs where a short piece of liner was installed to repair a leaking part of an existing pipe to lining of main lines only to full renovations where every pipe and connection is lined creating a complete new pipeline inside the existing old pipeline. A full renovation requires lining of pipes in various sizes, usually through multiple bends and including many connections. In many cases, branches, such as T-branches or Y-branches of a pipeline, have to be lined with a branch piece prior to lining the pipes which connect at the branch. An installation device is needed to move the branch piece into the branch point, position the branch piece accordingly, and open up the branch piece so that it is positioned against inner walls of the pipes in the branch point. The installation device can be removed from the pipeline once the epoxy resin of the branch piece has cured. After that, the pipes can be lined with liners running through the branch piece or ending within the branch piece with a proper overlap which prevents leaking.

Figure 1:
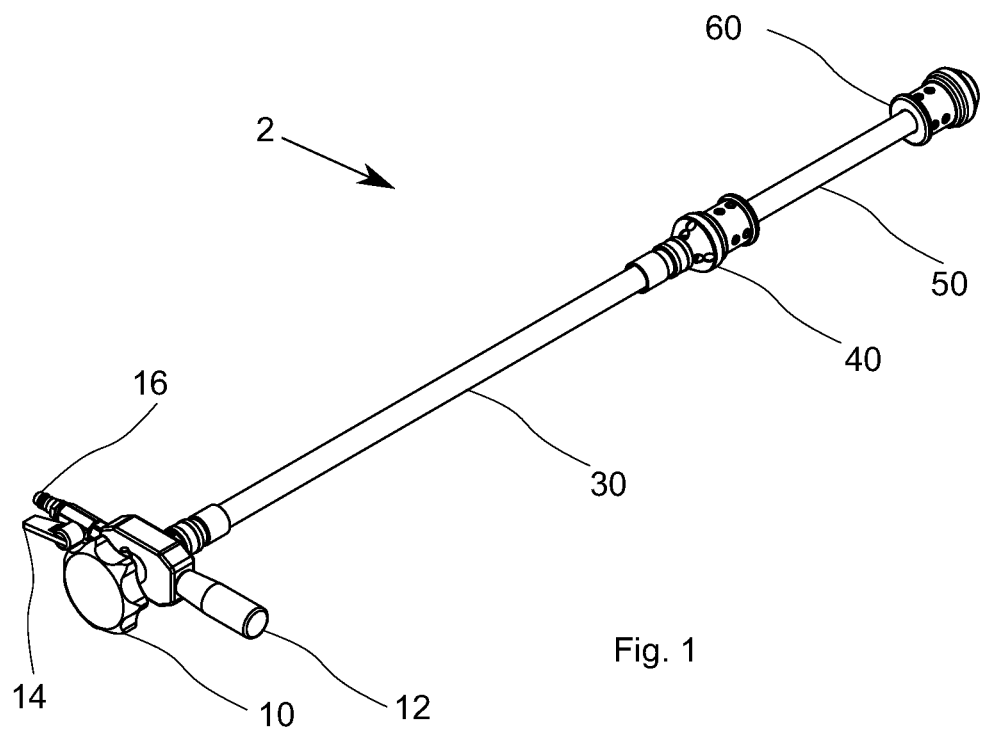
FIG. 1 shows an isometric presentation of a device according to an embodiment of the present invention.

FIG. 1 illustrates an installation device according to an embodiment of the present invention. The installation device can be used for installing a branch piece, made of typical liner material and impregnated with epoxy-resin, to a branch point of a pipe system. Other suitable impregnation resins may also be used. The branch point can, for example be a T-branch wherein two pipes connect in a 90 degrees angle or a Y-branch wherein two pipes connect in e.g. 30 to 60 degrees angle.

Figure 2:
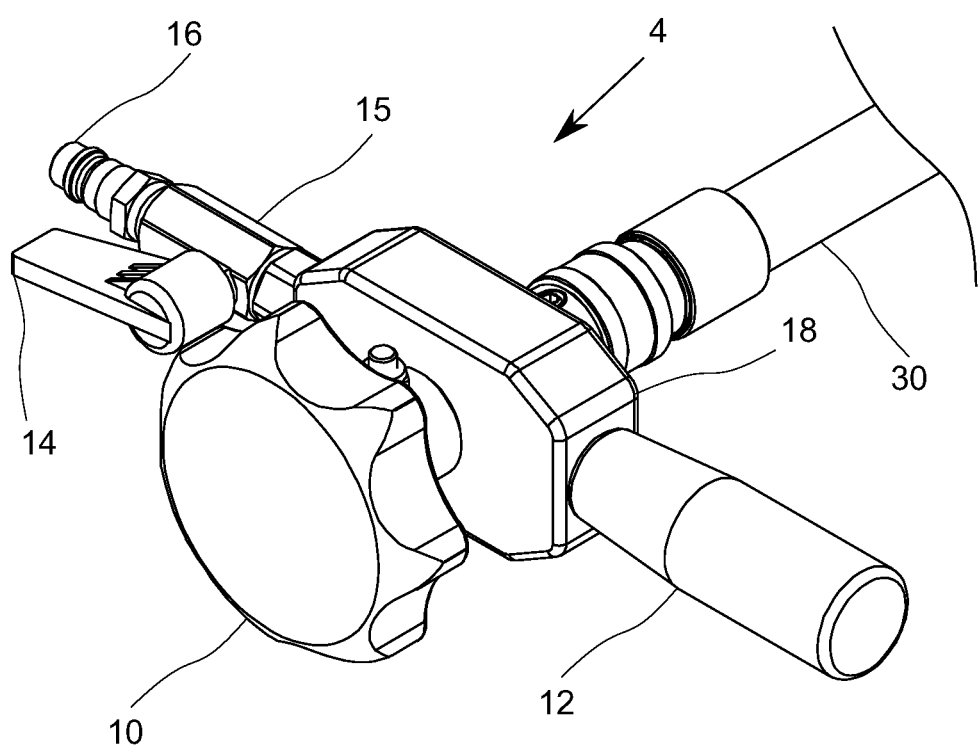
FIG. 2 shows a detail of the device of FIG. 1.
Figure 6:
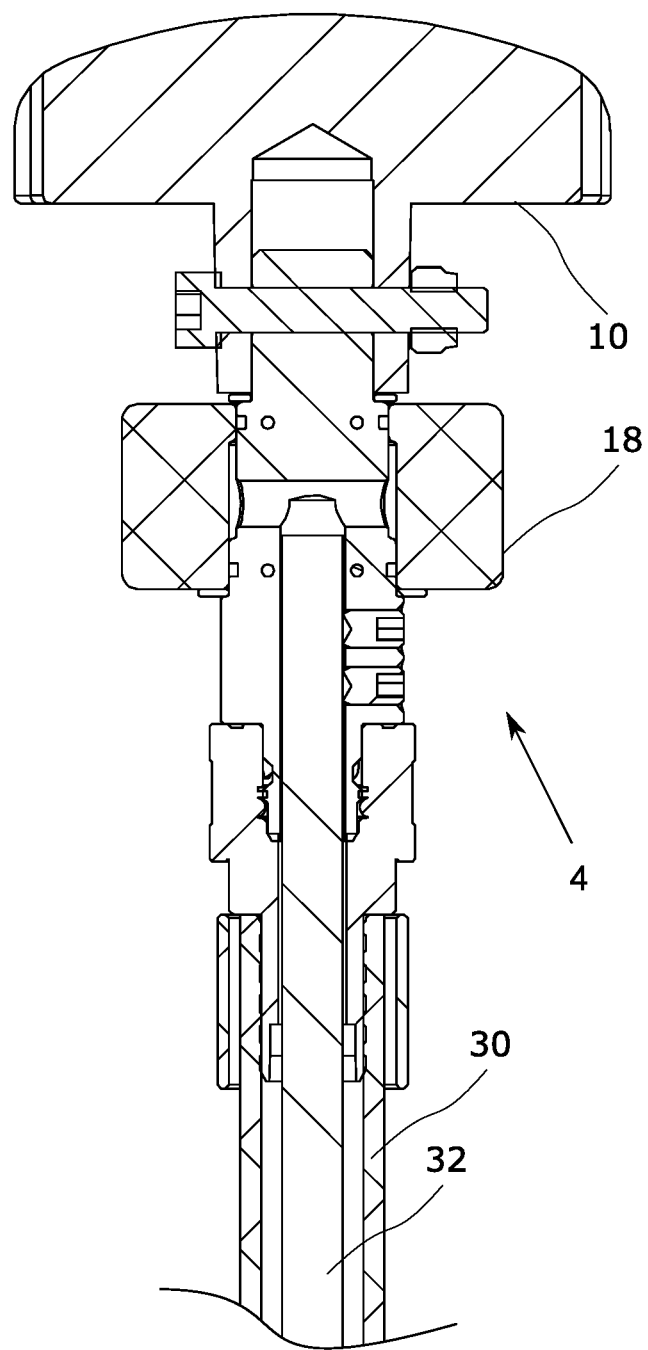
FIG. 6 shows upper part of the device of FIG. 4 in detail.
Figure 7:
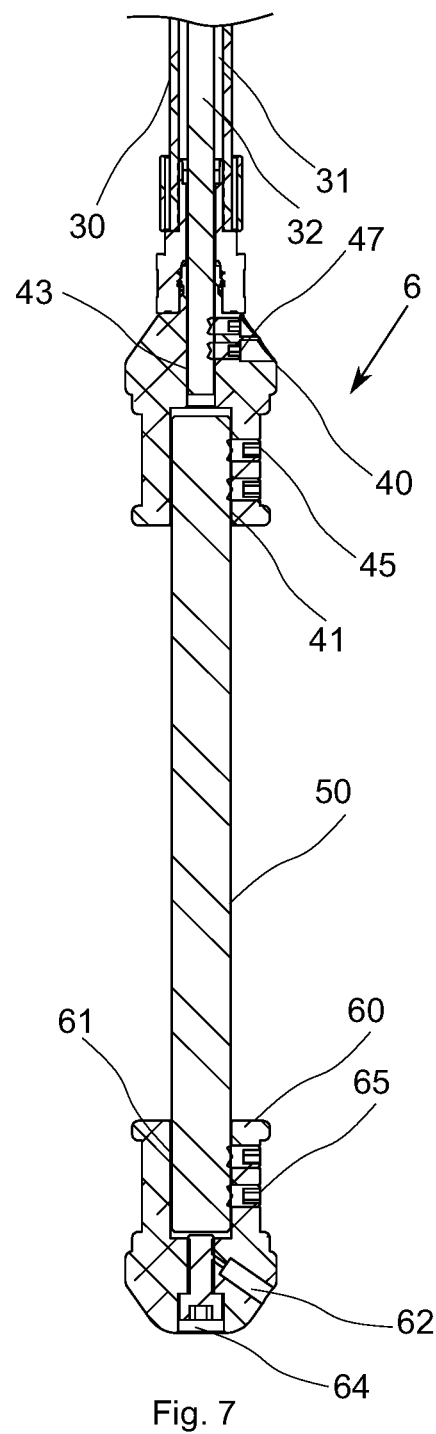
FIG. 7 is substantially similar to the embodiment shown in FIG. 5 but shows additional details.
Figure 8:
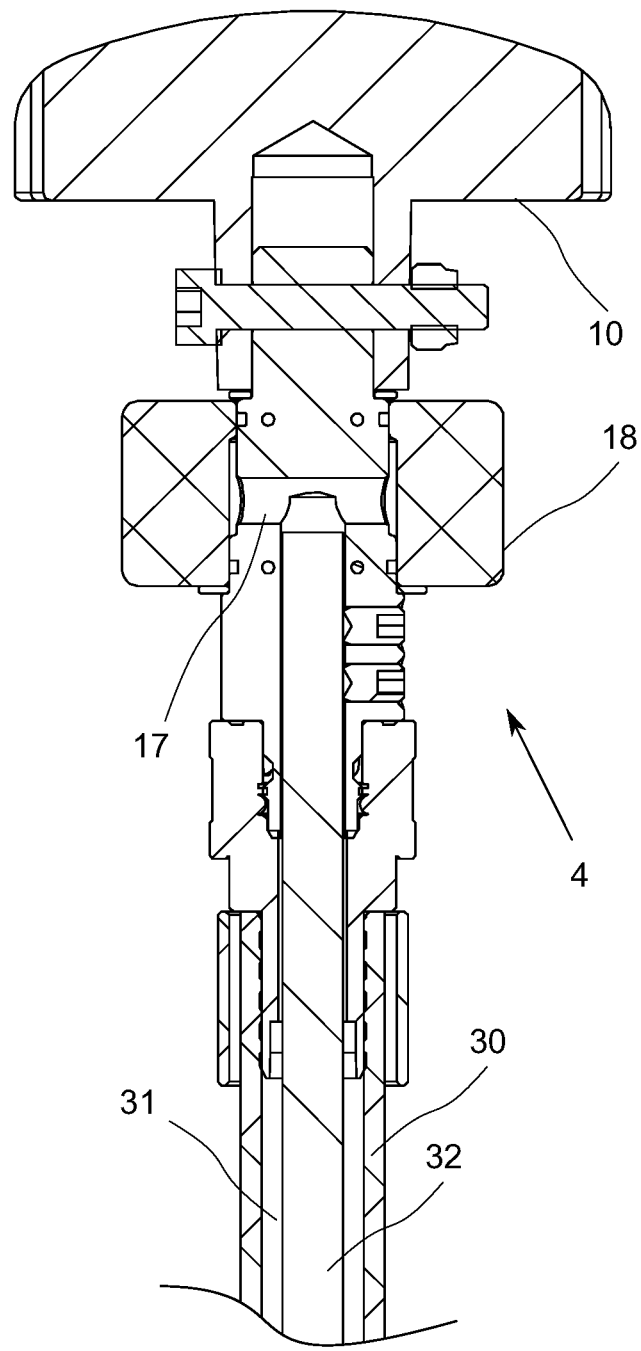
FIG. 8 is substantially similar to the embodiment shown in FIG. 6 but shows additional details.

The installation device 2 of FIG. 1 comprises a control unit 4 at one end of the installation device 2 and an expansion unit 6 at another end of the device opposite to the control unit. The control unit is shown in more detail in FIG. 2 and a section view of the expansion unit 6 is shown in more detail in FIG. 5. FIG. 6 illustrates a section view of the control unit 4. FIG. 3 shows the installation device and section A-A view is detailed in FIGS. 4 to 6.

The installation device 2 has an elongate duct 30 and a first shaft 32, that is disposed within or inside the duct 30, which connect the control unit 4 and the expansion unit 6. A small air gap or clearance 31 is provided between the duct 30 and the first shaft 32, i.e. the first shaft 32 has a smaller diameter than the inner diameter of the duct 30. Preferably, both, the duct 30 and the first shaft 32 have some flexibility such that those can be pushed in to a pipe (to be lined)

having bends and curves. The first shaft 32 is preferably made of metal wires having a core of twisted steel wires and one or more layers of steel wires wound around the core. This structure gives enough flexibility to the first shaft and allows air, steam, water and other fluids to flow within the duct 30 and first shaft 32.

The control unit 4 has a housing or body 18 which is attached to the duct 30 at one end thereof in an air-tight manner. A fluid connection from the outside of the installation device 2 into the inside of the duct 30 is arranged through a conduit 17 inside the body 18. A valve 15 is attached to an inlet of the body 18, which inlet is in fluid communication with the conduit 17 inside the body 18. The valve has a hose connector 16 for connecting a fluid hose to the device. For example, the fluid hose may be a pressured air hose delivering compressed air from a compressor, or a steam hose can be used. The fluid connection or fluid passage thus runs through the hose connector 16, valve 15, conduit 17 and body 18 into the duct 30 via the first shaft 32 which extends from inside the duct 30 to the conduit 17. The valve 15 has a lever 14 or similar means for closing and opening the valve 15 so that fluid flows into the installation device can be controlled. The control unit has a turning knob 10 which is connected to the first shaft 32 which runs through and inside the duct 30. The turning knob 10 can be rotated relative to the body 18 and rotation of the turning knob 10 rotates the first shaft 32 within the duct 30 but not the duct 30 itself since the duct 30 is attached to the body 18 but not to the knob 10. The body 18 also has a handle 12 that extends outwardly from the body 18. The handle 12 facilitates the handling of the installation device, especially when connecting a hose to the hose connector 16, operating the lever 14 or rotating the turning knob 10.

The duct 30, attached to the body 18 of the control unit at one end, is connected to a first barrel 40 at the opposite end. The connection between the duct 30 and the first barrel 40 is preferably realized with bearings or sliding surfaces between the first barrel 40 and the duct 30 which allow for rotation of the first barrel 40 relative to the duct 30. A seal is preferably used at the connection to prevent any leaking of fluid from the inside of the duct 30. The first barrel 40 is attached to the first shaft 32 by using e.g. clamp screws 47 or retainer screws through the first barrel 40 that push against the first shaft 32. Thus, rotation of the turning knob 10 rotates the first shaft 32 inside the duct 30 and it also rotates the first barrel 40 that is attached to the first shaft 32.

The first barrel 40 is attached to a second shaft 50. The second shaft 50 is attached to the opposite end of the first barrel 40 relative to the first shaft 32. The first barrel 40 is attached to the second shaft 50 by using e.g. clamp screws 45 or retainer screws through the first barrel 40 that push against the second shaft 50. Thus, rotation of the turning knob 10 rotates the first shaft 32 inside the duct 30, the first barrel 40 attached to the first shaft 32 and also the second shaft 50 attached to the first barrel 40. The second shaft 50 is, preferably, made of metal wires having a core of twisted steel wires and one or more layers of steel wires wound around the core. The second shaft 50 is preferably larger in diameter than the first shaft 32. This structure allows air, steam and other fluids to flow within the first shaft 32 itself and within the duct 30 so that fluids can flow from the hose connector 16 through valve 15, body 18, duct 30 and first shaft 32 all the way through the first barrel 40 and along the second shaft 50. The first barrel 40 preferably has cavities 41, 43 defined therein for accommodating or receiving an end of the first shaft 32 and an end of the second shaft 50. The cavities are connected to each other, thus forming a conduit through the first barrel 40 and enabling a fluid flow through the first barrel 40 via said cavities. The cavity 43 to receive the first shaft 32 is slightly larger in diameter than the first shaft 32 to facilitate the flowing of air or steam through the first barrel 40, for example, at most 1 mm larger in diameter. The cavity 41 to receive the second shaft 50 is slightly larger in diameter than the second shaft 50 to facilitate the flowing of air or steam through the first barrel 40, for example, at most 1 mm larger in diameter.

A second barrel 60 is attached on the other end of the second shaft 50, that is opposite to the end attached to the first barrel 40. The second barrel 60 is attached to the second shaft 50 by using e.g. clamp screws 65 or retainer screws through the first barrel 60 that push against the second shaft 50. Thus, rotation of the turning knob 10 rotates the first shaft 32 inside the duct, the first barrel 40 attached to the first shaft 32, the second shaft 50 attached to the first barrel 40 and also the second barrel 60 attached to the second shaft.

Figure 9:
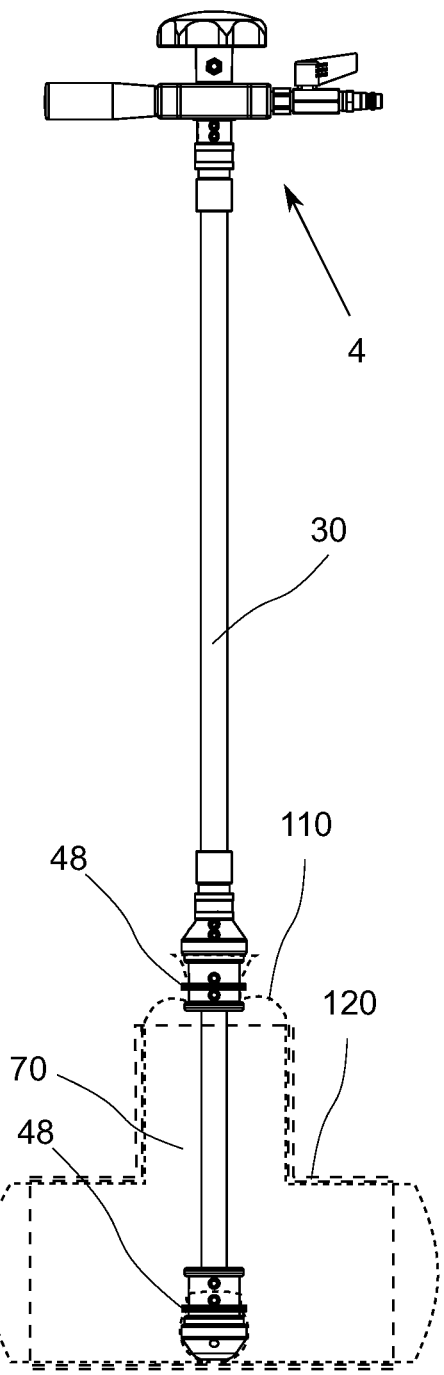
FIG. 9 shows a device according to an embodiment of the present invention in use with a branch piece on an inflated inflatable bladder.

Thus, when the installation device 2 is in use, as illustrated in FIG. 9, pressurized air or steam is supplied through the hose connector into the installation device. The air or steam supplied into the installation device 2 is released to an area 70 between the first barrel 40 and the second barrel 60. When the installation device is used in installation of a branch piece 120 (dashed line), an inflatable bladder 110 (dotted line) is attached to the first barrel 40 and the second barrel 60. Tape, rope, cable ties, or similar removable attachment devices 48 are used to attach the inflatable bladder 110 to the barrels, preferably in such a way that the inflatable bladder 110 surrounds the second shaft 50 from all sides. Thus, air or steam supplied through the hose connector 15 into the installation device, ends up in the inflatable bladder 110 and inflates it. The inflatable bladder used in an installation of a branch piece 120 is chosen based on the branch piece 120 that is used. For example, when lining a T-shaped branch, a T-shaped branch liner piece 120 is used, as shown in FIG. 9, and the installation device is equipped with a T-shaped inflatable bladder 110, as shown in FIG. 9, to ensure that when inflated, it opens up completely and fills the entire T-shaped branch piece, as shown in FIG. 9. The inflatable bladder can be attached to the barrels 40, 60 at different locations depending on from which pipe the branch is approached with the installation device.

Figure 10:
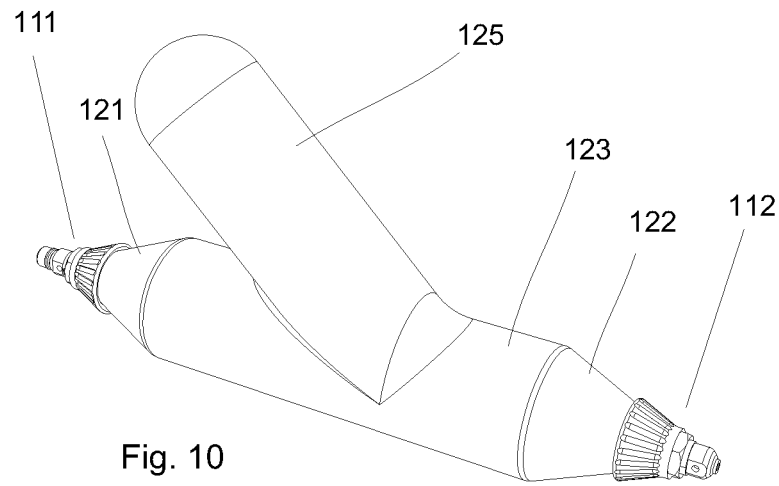
FIG. 10 illustrates an inflatable bladder arrangement according to an embodiment of the present invention.
Figure 11:
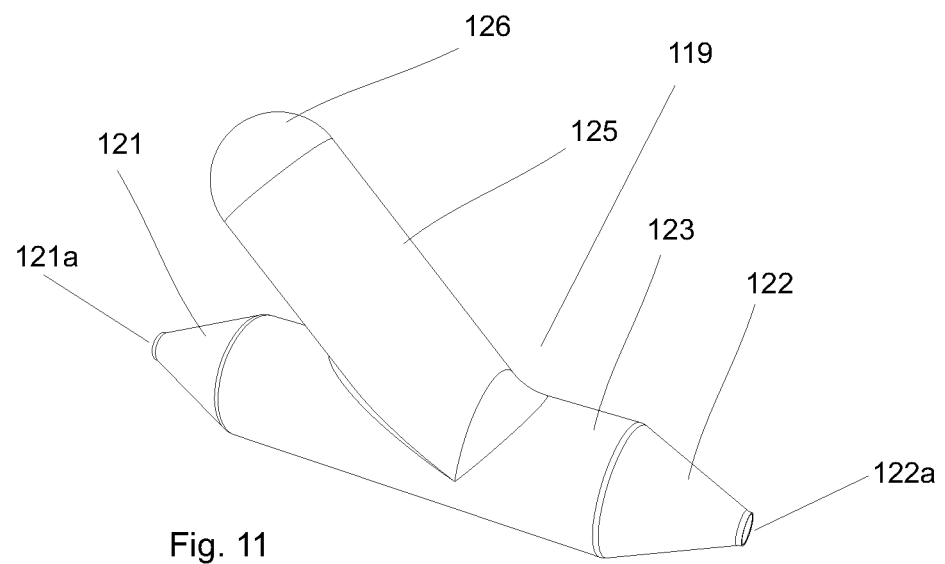
FIG. 11 illustrates an inflatable bladder according to an embodiment of the present invention.

Similarly, when lining a Y-shaped branch, a Y-shaped branch liner piece is used and the installation device is equipped with a Y-shaped inflatable bladder 119, as shown in FIG. 11, to ensure that when inflated, it opens up completely and fills the entire Y-shaped branch piece. The inflatable bladder arrangement of FIG. 10 can be used in the installation device 2 of FIGS. 1 to 9 such that the first barrel 40 is replaced by a first bladder connector 111 and the second barrel 60 is replaced by a second bladder connector 112, and by using a bladder shown in FIG. 11. The inflatable bladder arrangement of FIG. 10 can also be used with a T-shaped inflatable bladder instead of the Y-shaped inflatable bladder shown in FIGS. 10 and 11.

The branch piece 120 can be impregnated with various types of epoxy resin. When using epoxy resin which cures over time, the inflatable bladder 110 can be inflated by supplying pressurized air through the hose connector 15. When a heat-curing epoxy resin is used, the inflatable bladder 110 can be inflated with hot steam. Because the steam cools down quickly, a flow of steam has to be arranged. Therefore, the second barrel 60 can include a narrow outlet 62 which can be controlled with e.g. a screw valve 64 or some other valve type which controls the leak rate through the second barrel 60. For example, a threaded hole with a screw can be used when the outlet 62 opens in the threaded hole. The second barrel 60 preferably has a cavity 61 defined therein for accommodating an end of the second shaft 50. The cavity 61 for receiving the end of the second shaft 50 is slightly larger in diameter than the second shaft 50 to facilitate the flowing of air or steam through the second barrel 60 if the outlet 62 is open, for example, at most 1 mm larger in diameter. When the screw blocks the outlet, no leaking occurs. Twisting or turning the screw open exposes the outlet allowing a leak through the outlet 62. The leak rate can be adjusted with the screw by controlling how much of the outlet is opened. The leak rate should be high enough to keep the temperature inside the inflatable bladder 110 high enough so that the curing of the epoxy takes place but low enough to keep the inflatable bladder 110 inflated. Also, the amount of steam supplied and its temperature can be adjusted accordingly.

When the installation device described herein is used, a single user can perform the lining of a branch. The expansion unit is prepared by attaching a suitable inflatable bladder 110 and prepared branch piece 120 to the first barrel 40 and the second barrel 60. Then, the prepared expansion unit 6 is pushed in a pipeline until it is in a branch which is to be lined with the branch piece. The duct is stiff enough so that it can be pushed into the pipeline and through any bends and curves in the pipeline. Once the expansion unit 6 of the installation device 2 is in the branch point of the pipeline, the user adjusts the branch piece into correct angle relative to the branch of the pipeline by turning the turning knob 10 which rotates the barrels 40, 60 of the expansion unit and therefore also rotates the inflatable bladder 110 and the branch piece 120 attached to the barrels 40, 60. The operation can be monitored with a camera. Once the branch piece is in the correct position, the inflatable bladder is inflated by controlling the valve 15 with the lever 14. FIG. 9 illustrates a T-shaped branch piece 120 on an inflated T-shaped inflatable bladder 110. Finally, when the branch piece is cured in its place, the hose is detached from the hose connector 16 and the valve 15 is opened which deflates the inflatable bladder and the installation device can be pulled out from the pipeline and used again.

An advantage of the embodiments of present invention compared to prior art installation systems is that one installation device with a single duct is used from one pipeline entry point instead of using separate air hoses, pushing rods and pulling cables from two or three pipeline entry points. The presented installation device enables operations of pushing, turning, inflating, steaming, deflating and pulling which significantly reduces time and personnel needed for lining a branch of a pipeline.

FIG. 10 illustrates an inflatable bladder arrangement according to an embodiment of the invention. The arrangement consists of an inflatable bladder 119 having a first tubular section 123 and a second tubular section 125 in fluid connection with the first tubular section 123. The inflatable bladder 119 is clamped onto a device 109 for inflating the bladder 119 using a first bladder connector or first barrel 111 and a second bladder connector or second barrel 112 at opposite ends of the device 109. It is to be understood that the first barrel 111 can replace the first barrel 40 and the second barrel 112 can replace the second barrel 60 in the above figures. The invention is not limited to a certain number of tubular sections. For example, in embodiments of the invention, the second tubular section 125 can be omitted or a third tubular section can be added as well as fourth and fifth tubular sections.

FIG. 11 illustrates an inflatable bladder 119 according to an embodiment of the invention. The inflatable bladder 119 is preferably configured for installing a liner in a pipeline by taking into account the size and material of the bladder. The bladder 119 comprises a first tubular section 123 having a first end and a second end opposite to the first end. The bladder 119 further comprises a first reducer portion 121 at a first end of the first tubular section 123 and a second reducer portion 122 at a second end of the first tubular section 123, opposite to the first end of the tubular section 123. The first tubular section and both reducer portions can be fabricated as a single piece or each as a separate piece assembled together to form a single continuous bladder. The first reducer portion 121 and the second reducer portion 122 each have an aperture 121a, 122a into the bladder 119. The apertures 121a, 122a are arranged at distal ends of the bladder 119. The apertures have a smaller diameter than diameter of the first tubular section 123 and thus the reducer portions 121, 122 reduce the diameter of the bladder 119 towards distal ends of the bladder. The reduced diameter of the apertures eliminates the need for folding the bladder in order to attach it to the bladder connectors 111, 112 of the device 109 in an air-tight manner. Preferably the diameter of said apertures 121a, 122a is 10 mm to 40 mm and more preferably 15 mm to 30 mm. Preferably the diameter of said apertures 121a, 122a is at most 50% of the diameter of the first tubular section 123 and more preferably at most 30% of the diameter of the first tubular section 123.

In an embodiment, the diameter of the first reducer portion 121 and the second reducer portion 122 decreases along a shape of a cone, preferably along a shape of a concentric cone but also a shape of an eccentric cone can be used. The wider end of the cone shape is closer to the first tubular section 123 of the bladder and the narrower end the cone shape is closer to the aperture 121a, 122a of the reducer portion 121, 122. The diameter of the reducer portion can also decrease along other shapes, such as a half of a sphere, a paraboloid or a combination of the previously mentioned shapes. Also step-wise reduction of the diameter can be used.

In an embodiment of the invention, the inflatable bladder 119 comprises a second tubular section 126 having an open end and a closed end 126. Preferably the closed end forms a shape of a cone, a paraboloid or a half of a sphere and is located opposite to the open end. The first tubular section 123 has a sidewall opening defined therein and the open end of the second tubular section 126 is connected to the first tubular section 123 at said sidewall opening so that there is fluid communication between the first tubular section 123 and the second tubular section 125. The second tubular section 126 is preferably in 30° to 150° and to the first tubular section 123 and more preferably in 45° to 135° degrees angle to the first tubular section 123. In an embodiment said the first tubular section 123 and said second tubular section 125 are perpendicular to each other.

In an embodiment, the inflatable bladder 119 comprises a third tubular section having an open end and a closed end. Preferably the closed end forms a shape of a cone, a paraboloid or a half of a sphere and is located opposite to the open end of the third tubular section. The first tubular section 123 has a second sidewall opening defined therein and the open end of the third tubular section is connected to the first tubular section 123 at said second opening in the sidewall so that there is fluid communication between the first tubular section 123, the second tubular section 125 and the third tubular section. In similar manner, further tubular sections can be disposed on the first tubular section 123.

In an embodiment, the inflatable bladder 119 is made of silicone or comprises silicone at least 90 weight-%. Preferably, the inflatable bladder is reinforced with fibers preventing expansion of the bladder beyond a predetermined level of expansion in order to prevent rupture of the inflatable bladder. The fibers can be for example textile fibers disposed within the silicone mass. The fibers can be in a form of a net covering at least partially the bladder 119. Also, other types of materials can be used, such as rubber, plastic, textile and combinations thereof.

The bladder 119 can be manufactured in one piece by casting it in a mold or by injection molding. The bladder can also be manufactured part by part and then assembled together. The bladder can be divided e.g. to separate tubular parts, closing portions 126 of second tubular section 125 and further tubular sections, and reducer portions 121, 122 of the first tubular section 123. The parts can be assembled together by using a suitable adhesive or by using the same material as the parts, for example silicone for silicone parts. Silicone bonds very well to silicone. However, when using a second silicone step, a preferable way to adhere to silicone is when the material is not fully crosslinked (cured). It would be advisable not to post-bake the parts prior to performing the silicone adhesion step.

Figure 12:
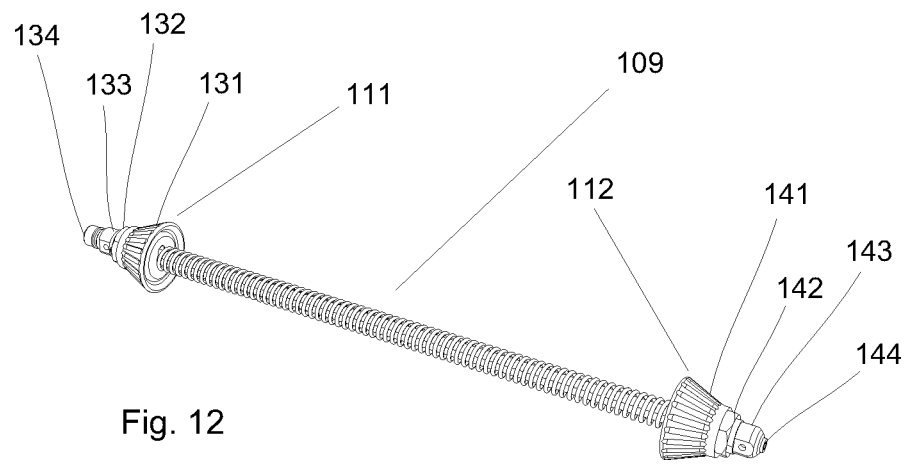
FIG. 12 illustrates a device for inflating an inflatable bladder according to an embodiment of the present invention.
Figure 13:
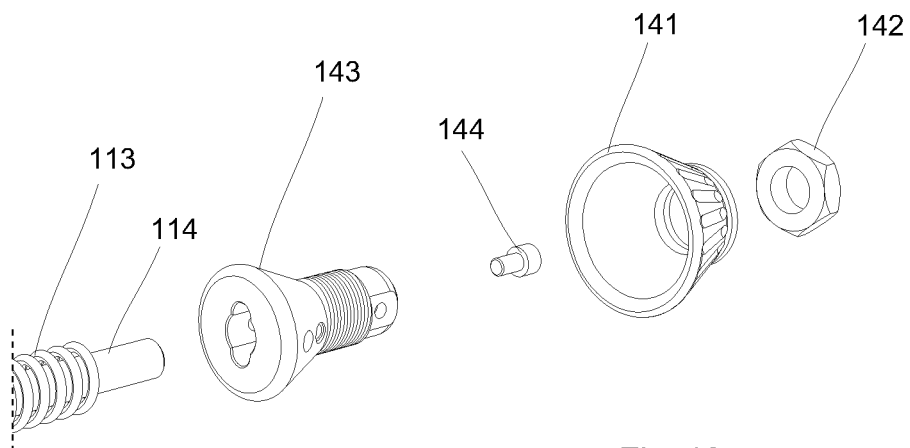
FIG. 13 illustrates details of the device of FIG. 12.

Now referring to FIG. 12 which illustrates a device 109 according to an embodiment of the invention for inflating an inflatable bladder 119 such as the bladder described herein. FIG. 13 illustrates details of the device of FIG. 12, especially the second bladder connector 112.

In FIG. 12 is a device 109 for inflating an inflatable bladder 119. The device comprises an elongated flexible body 114. The body can be a tube or a rod of a flexible material, or a flexible wound steel cable. The body 114 has a first bladder connector 111 at a first end of the body and a second bladder connector 112 at a second end of the body, opposite to the first end of the body. The device also comprises an inlet 134 for pressurized air to be used in inflating the bladder.

The first bladder connector 111 and the second bladder connector 112 both comprise an outer fitting 131, 141, an inner fitting 133, 143 and clamping mechanisms 132, 142 for clamping an inflatable bladder between said outer fitting and said inner fitting of the bladder connectors 111, 112. So instead of using pipe clamps, cable ties and adhesive tape for attaching the bladder to the device, the bladder is clamped between the inner and outer fittings of the bladder connector. Preferably the inner and outer fittings are sized to match the distal ends of the bladder so that folding of the bladder is avoided and thereby an airtight attachment is more easily achieved.

In an embodiment, the outer fitting 131, 141 preferably comprises a concentric conical section on its inner side. Similarly, the inner fitting 133, 143 comprises a concentric conical section on its outer side. The conical section of the inner fitting is configured to be disposed at least partially into the conical section of the outer fitting. Also, eccentric conical shapes can be used. Preferably the ascending angle of the conical shape on the inner fitting is the same as the ascending angle of the conical shape on the outer fitting or at least within 5° of each other. The same angle yields larger contact area to the bladder and provides a longer lifetime. A slightly different ascending angle, e.g. less than 5°, yields a smaller contact are to the bladder but provides a better seal compared to same angles when applying the same clamping force. Also, other shapes than conical shapes can be used, such as half of a sphere, a paraboloid or a combination of the previously mentioned shapes. Also step-wise reduction of the diameter can be used.

In an embodiment, clamping mechanisms comprise threads disposed on the inner fitting 133, 143 and a threaded element 132, 142, wherein the outer fitting 131, 141 is disposed between said inner fitting 133, 143 and said threaded element 132, 142. Threads on the inner fitting can be inner threads and the threaded element a bolt in this case. Threads on the inner fitting can also be outer threads and the threaded element a nut 132, 142 in that case. Also, other types of clamping mechanisms can be used.

The conical section of the inner fitting 133, 143 is inserted into the bladder 119 by slightly stretching the aperture 121a, 122a of the bladder such that the reducer portion 121, 122 of the bladder settles against the conical portion of the inner fitting. The outer fitting 131, 141 is the placed onto the reducer portion of the bladder such that the reducer portion is partially between the conical sections of the inner and outer fittings. Now tightening the clamping mechanisms, e.g. a nut 132, 142 on outer threads of the inner fitting, forces the conical shapes of the inner and outer fittings closer together thereby clamping and securing the bladder between the inner and outer fittings of the bladder connector 111, 112.

In an embodiment, the device further comprises a helical spring 113 around said elongated flexible body 114. Use of a spring adds both stiffness of the body but also elasticity of the body as the helical spring is biased to return to its shape after bending.

In an embodiment the inner fitting 133 of the first bladder connector 111 comprises the inlet 134 for pressurized air. The inlet is in fluid connection with the body 114 of the device so that air flowing in through the inlet ends up inside a bladder attached to the device. The inner fitting 133 can have a through hole or a channel for the pressurized air to flow through it. The inner fitting 143 of the second bladder connector 112 can comprise a safety valve 144 for releasing pressurized air. The safety valve 144 is in fluid connection with the body 114 of the device so that excessive pressure is released from inside the bladder through the safety valve. The inner fitting 143 can have a through hole or a channel for the pressurized air to flow through it.

An embodiment of the invention is an inflatable bladder arrangement. The arrangement comprises an inflatable bladder 119 described within the present disclosure and a device 109 described within the present disclosure for inflating the inflatable bladder 119. In addition, the arrangement can comprise air hose configured to be attached to the inlet 134 of the inner fitting of the first bladder connector 111. Said air hose is flexible but preferably stiff enough to push, pull and turn the device 109 with a bladder 119 attached to it. Alternatively, the air hose can house a steel wire within the air hose which facilitates pushing, pulling and turning the device 109 inside a pipeline.

It is apparent to a person skilled in the art that the above exemplary embodiments are rather simple in structure and operation for the purposes of illustration. By following the model shown in this patent application, it is possible to construct different and even very complex solutions that utilize the inventive idea disclosed in this patent application.

I claim:

1. An installation device comprising:
   a body having an inlet defined therein for receiving fluids;
   a turning knob in operative engagement with the body and rotatable relative to the body, the turning knob being attached to a first shaft at one end of the first shaft and an opposite end of the first shaft being attached to a first barrel;

a duct attached to said body and extending between the body and the first barrel forming a passage for fluids from the inlet of the body to an area between said first barrel and a second barrel;

a second shaft being in operative engagement with the first barrel and extending between said first barrel and said second barrel;

wherein the first barrel and the second barrel both comprise an outer fitting, an inner fitting and clamping mechanism for clamping an inflatable bladder between said outer fitting and said inner fitting of the first and second barrel; and wherein the inner fitting of the second barrel comprises a safety valve for releasing pressurized air, the safety valve being in fluid connection with the body of the installation device.

2. The installation device according to claim 1, wherein said outer fitting comprises a concentric conical section on its inner side and said inner fitting comprises a concentric conical section on its outer side, said conical section of the inner fitting is configured to be disposed at least partially into the conical section of the outer fitting.

3. The installation device according to claim 1, wherein said clamping mechanism comprises threads disposed on the inner fitting and a threaded element, wherein the outer fitting is disposed between said inner fitting and said threaded element.

4. The installation device according to claim 1, wherein the device further comprises a helical spring.

5. The installation device to claim 1, wherein the inner fitting of the first barrel has an inlet defined therein for pressurized air, the inlet being in fluid connection with the body of the device.

6. The installation device according to claim 1, wherein the duct and the first shaft are flexible and the first shaft comprises twisted steel wires.

7. The installation device of claim 1, wherein the first barrel has a cavity defined therein for accommodating the one end of the first shaft and another cavity defined therein for accommodating an end of the second shaft, said cavities being in fluid connection with one another, thus forming a conduit through said first barrel and enabling a fluid flow through said first barrel via said cavities.

8. The installation device of claim 7, wherein the second barrel has a cavity defined therein for accommodating an end of the second shaft.

9. The installation device of claim 1, wherein the second barrel includes a controllable outlet for controlling a leak rate through the second barrel.

* * * * *